United States Patent
Lai

(10) Patent No.: US 6,276,090 B1
(45) Date of Patent: Aug. 21, 2001

(54) FLOWERPOT WITH AUTO-WATERING CONTROL

(76) Inventor: Yuan-Song Lai, No. 32, Fuyi Rd., Taiping City, Taichung County (TW)

( * ) Notice: Subject to any disclaimer, the term of this patent is extended or adjusted under 35 U.S.C. 154(b) by 0 days.

(21) Appl. No.: 09/432,729

(22) Filed: Nov. 2, 1999

(51) Int. Cl.[7] .................................................. A01G 25/00
(52) U.S. Cl. .......................................................... 47/79
(58) Field of Search ........................................ 47/79, 65.5

(56) References Cited

U.S. PATENT DOCUMENTS

| | | | | |
|---|---|---|---|---|
| 4,148,155 | * | 4/1979 | Allen | 47/79 |
| 4,265,050 | * | 5/1981 | Buescher | 47/79 |
| 4,745,707 | * | 5/1988 | Newby | 47/79 |
| 4,962,613 | * | 10/1990 | Nalbandian | 47/47 |
| 5,097,626 | * | 3/1992 | Mordoch | 47/79 |
| 5,272,835 | * | 12/1993 | Stern | 47/79 |

* cited by examiner

*Primary Examiner*—Charles T. Jordan
*Assistant Examiner*—Francis T. Palo
(74) *Attorney, Agent, or Firm*—Rosenberg, Klein & Lee

(57) ABSTRACT

A flowerpot, which includes a pot body mounted in a transparent casing, a water chamber defined within the casing outside the pot body for keeping living fish, water animals and plants, a porous soil carrier mounted in the pot body for holding soil for growing plants, an upright locating tube for guiding outside air into a space in the pot body below the soil carrier, and a water hole for guiding water from the water chamber to the space in the pot body below the soil carrier, and a float for automatically controlling the water level in the space in the pot body below the soil carrier.

4 Claims, 6 Drawing Sheets

FLOWERPOT WITH AUTO-WATERING CONTROL

BACKGROUND OF THE INVENTION

The present invention relates to flowerpots, and more particularly to such a flowerpot, which comprises a pot body, a soil carrier mounted in the pot body for growing plants, a water chamber defined within a transparent casing thereof around the pot body for keeping living fish, water animals and plants, and means to guide water from the water chamber to the inside of the pot body and to control the water level in the pot body.

When growing plants in flowerpots, the soil in the flowerpots must be regularly watered. However, the water content in the soil must be controlled within a suitable range, so as to not damage the plants. FIG. 1 shows a flowerpot according to the prior art. This structure of flowerpot comprises a casing 1, a pot body 2 mounted within the casing 1 to hold soil for growing plants, a water chamber H defined within the casing 1 around the pot body 2 for holding water, and a water absorbing member 3 embedded in the soil in the pot body 2 and extended through a bottom hole on the pot body 2 into the water chamber H for enabling the plants to absorb sufficient water from the soil. This structure of flowerpot is still not satisfactory in function. The drawbacks of this structure of flowerpot are numerous as outlined hereinafter:

1. Because the water-absorbing member 3 is embedded in the soil in the pot body 2, the soil may be excessively wetted, causing the roots of the plants to be damaged.
2. The water-absorbing member 3 deteriorates with use quickly, thereby causing water unable to be delivered to the soil in the pot body sufficiently.
3. The pot body has not means for guiding outside air to the roots of the plants in the soil in the pot body.

SUMMARY OF THE INVENTION

The present invention has been accomplished under the circumstances in view. According to one aspect of the present invention, the flowerpot comprises a pot body mounted in a transparent casing, a water chamber defined within the casing outside the pot body for keeping living fish, water animals and plants, a soil carrier mounted in the pot body for holding soil for growing plants. According to another aspect of the present invention, a guide tube is mounted in the pot body below the soil carrier for guiding water from the water chamber to the inside of the pot body for wetting the soil. According to still another aspect of the present invention, air guide means is provided for guiding outside air into the pot body for the plants, and the soil carrier has air holes disposed in communication with the air guide means for the passing of air. According to still another aspect of the present invention, valve means is provided for automatically controlling the water level in the space in the pot body below the soil carrier. According to still another aspect of the present invention, an air hole is provided on the topside of the water chamber, and an air pump motor can be used to pump air into the water in the water chamber.

DETAILED DESCRIPTION OF THE PREFERRED EMBODIMENT

Figure 1:
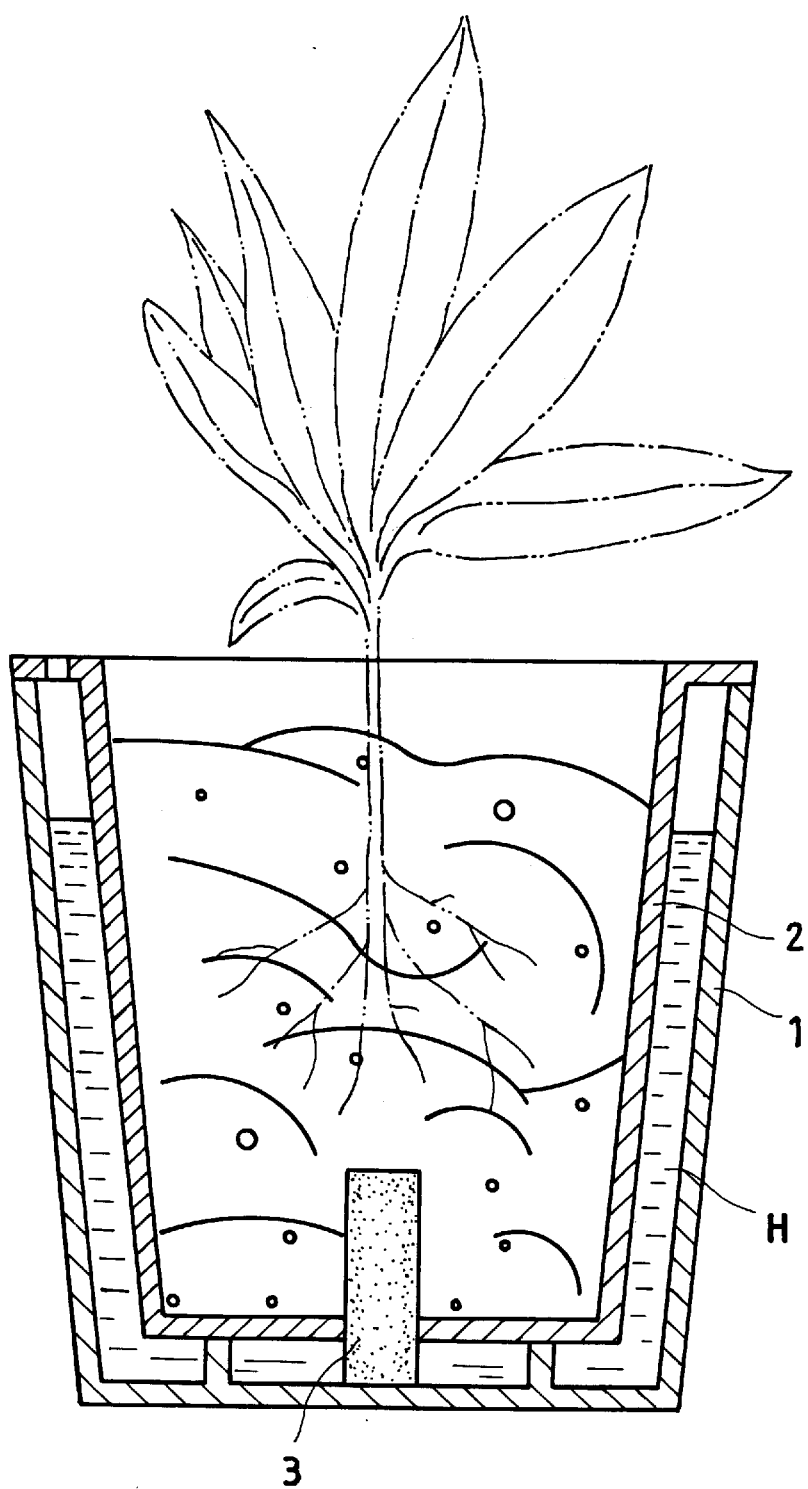
FIG. 1 illustrates a flowerpot according to the prior art.
Figure 2:
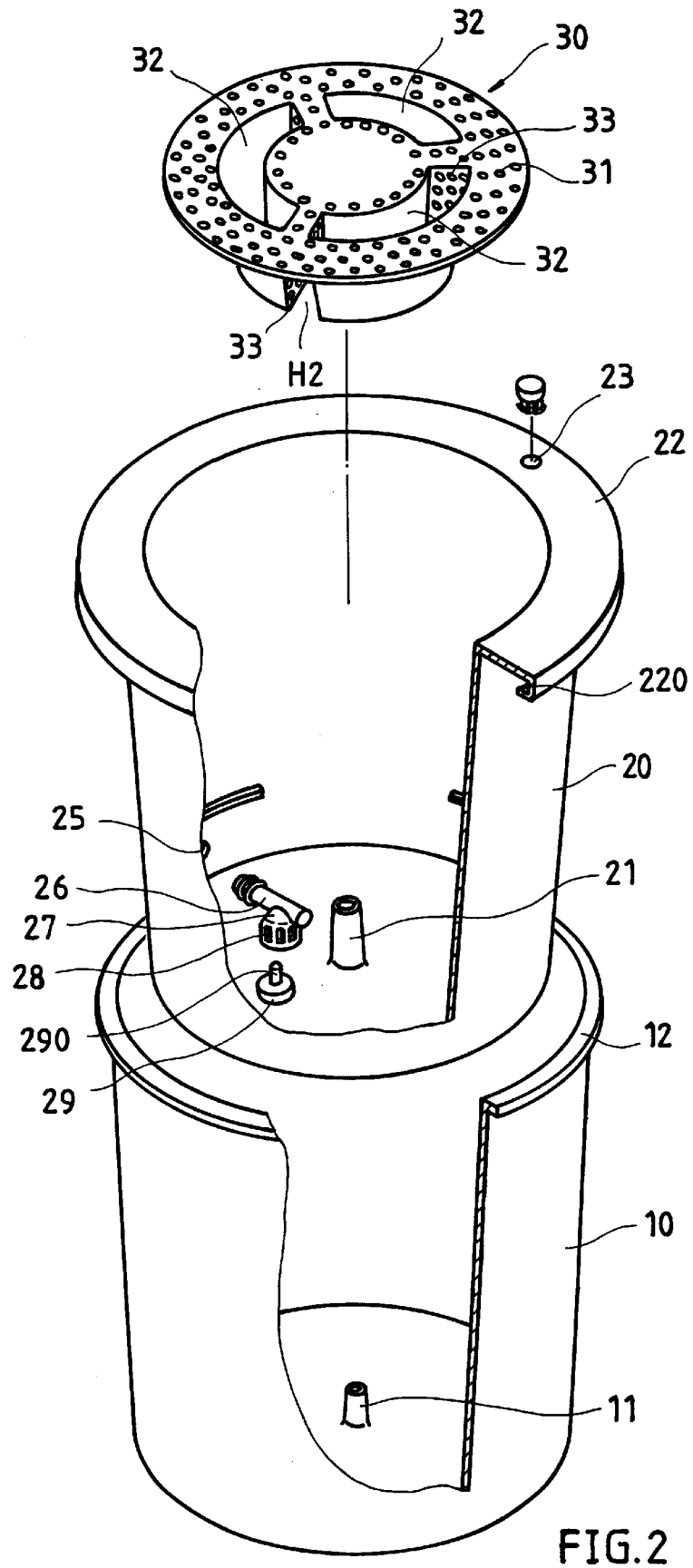
FIG. 2 is an exploded view of a flowerpot according to the present invention.
Figure 3:
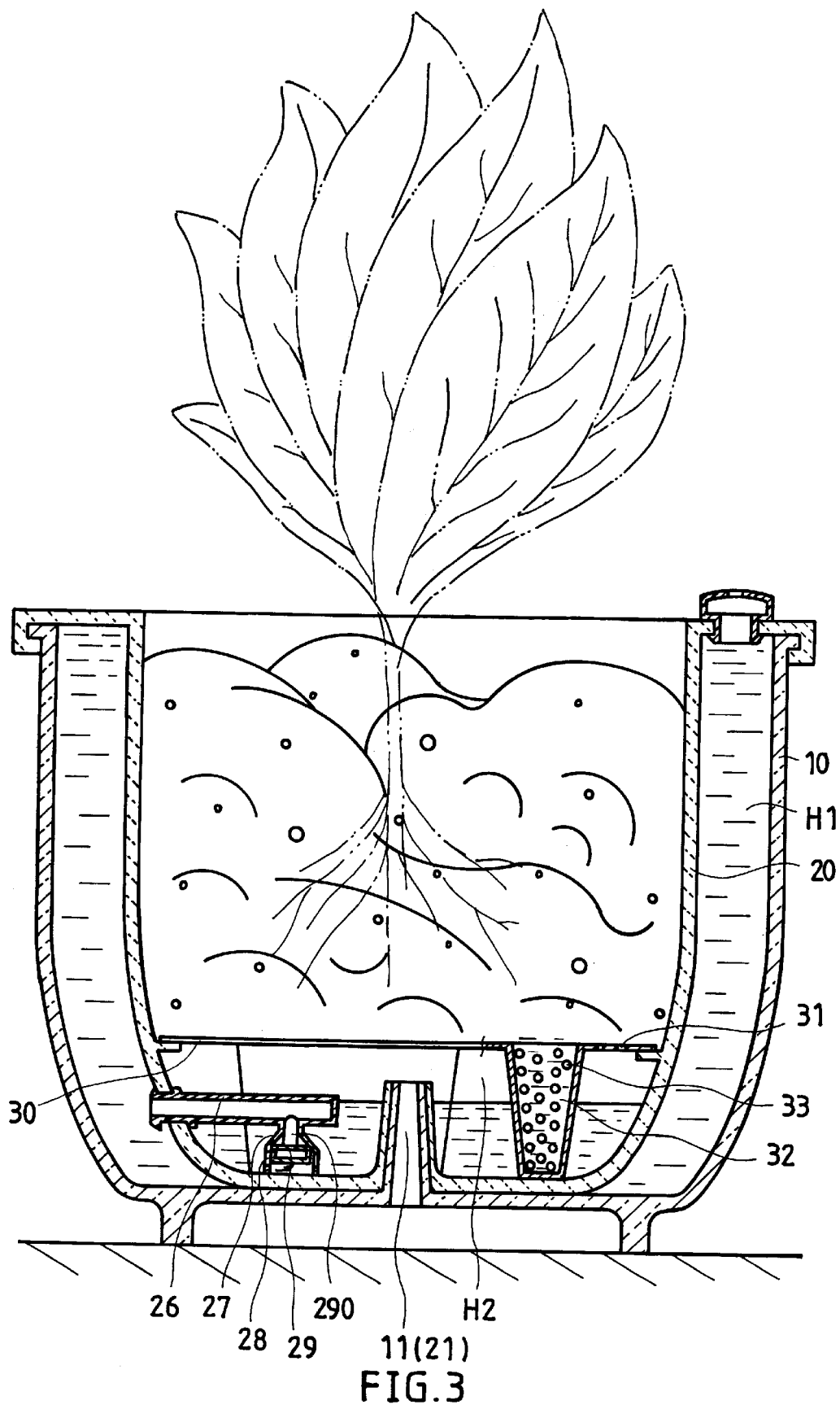
FIG. 3 is a sectional view of the present invention, showing water filled in the water chamber and the space within the pot body below the soil carrier.
Figure 5:
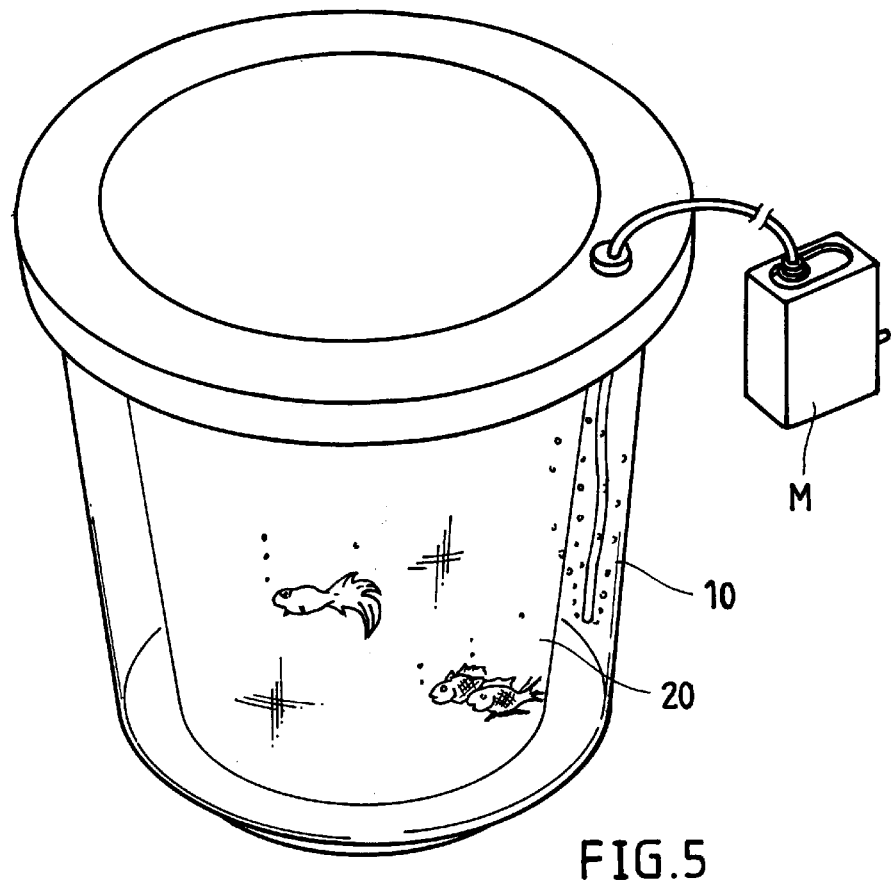
FIG. 5 is an applied view of the present invention, showing an air pump motor used with the flowerpot.

Referring to FIGS. 2, 3 and 5, a flowerpot in accordance with the present invention comprises a hollow, cylindrical, top-open casing 10, a hollow, cylindrical, top-open pot body 20 mounted within the casing 10, and a soil carrier 30 mounted inside the pot body 20. The casing 10 comprises an upright locating tube 11 raised from the center of the bottom wall thereof, and inserted into an upright locating tube 21 at the center of the bottom wall of the pot body 20 to hold the pot body 20 in place. The soil carrier 30 comprises a plurality of air vents 31, and a plurality of recessed top-open chambers 32. A bottom space H2 is defined in the bottom side of the soil carrier 30. The recessed top-open chambers 32 comprise a plurality of through holes 33 respectively disposed in communication with the bottom space H2. The casing 10 is a transparent water container, having a coupling flange 12 raised around the border of the top open side thereof. The pot body 20 comprises a rim 22 supported on the topmost edge of the casing 10, and a coupling flange 220 raised around the border of the rim 22 and hooked on the coupling flange 12 at the casing 10. After installation of the pot body 20 in the casing 10, a water chamber H1 is defined within the casing 10 around the outside wall of the pot body 20 for keeping living fish, water animals and plants. A through hole 25 is made through the peripheral wall of the pot body 20 at a suitable elevation. A guide tube 26 is fastened to the through hole 25. The guide tube 26 has an outer end opened and disposed in communication with the water chamber H1, an inner end closed and suspended inside the pot body 20, and a water hole 260 disposed at the bottom side near the inner end for guiding water from the water chamber H1 to the inside of the pot body 20. A hollow, conical hood 27 is provided around the water hole 260, having a plurality of water holes 28. A float 29 is mounted inside the hood 27, having a valve stem 290 aimed at the water hole 260. When the water chamber H1 is filled up with water, water flows from the water chamber H1 through the water hole 260 on the guide tube 26 and the water holes 28 on the hood 27 to the bottom space H2 inside the pot body 20 below the soil carrier 30. When the water level in the bottom space H2 surpasses the elevation the hood 27, the float 29 is moved upwards with water to force the valve stem 290 into the water hole 260 on the guide tube 26, and to stop water from passing through the water hole 260. Because the upright tube 11 at the casing 10 is inserted into the upright tube 21 at the pot body 20, outside air is allowed to pass through the upright tubes 11 and 21 into the inside of the pot body 20.

Referring to FIG. 3 again, the soil carrier 30 is mounted inside the pot body 20 and spaced above the topmost edge of the upright tube 21 in the pot body 20, and the guide tube 26 is suspended in the pot body 20 at a lower elevation than the topmost edge of the upright tube 21, therefore the bottom space H2 has a lower half filled with water, and an upper half filled with air. After installation of the soil carrier 30 in the pot body 20, soil is put in the pot body 20 and carried on the soil carrier 20 for growing plants. Water flows from the bottom space H2 through the through holes 33 into the recessed top open chambers 32 to wet the soil, so that plants can absorb sufficient water from the soil. Further, because air circulates through the upright tube 11 at the casing 10 between the atmosphere and the bottom space H2, plants can obtain fresh air from the bottom space H2.

Figure 4:
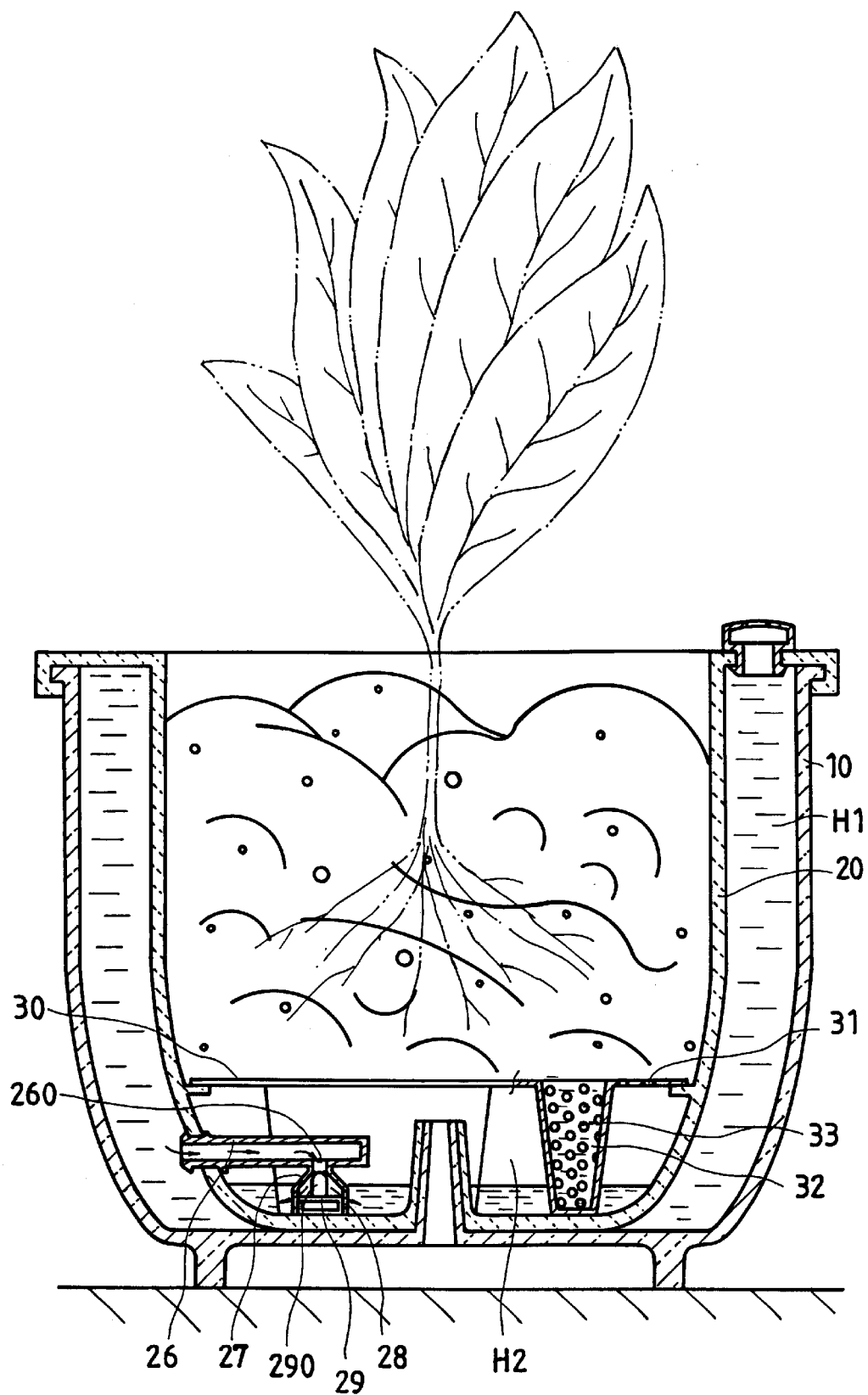
FIG. 4 is similar to FIG. 3 but showing a lower water level state in the pot body.

Referring to FIG. 4 and FIG. 3 again, because the float 29 moves up and down with the level of water in the bottom space H2, the valve stem 290 is moved with the float 29 to close/open the water hole 260 subject to the lever of water in the bottom space H2. Therefore, the water level in the bottom space H2 is constantly maintained within a limited range. Because the level of water in the bottom space H2 is automatically controlled within a limited range, it is not necessary to water the plants, and a proper amount of water is constantly provided in the pot body 20 for the plants. Further, because the level of water in the bottom space H2 is automatically controlled within a limited range, sufficient water can be maintained in the water chamber H1 for keeping living fish, water animals and plants.

Referring to FIG. 5 and FIGS. 2 and 3 again, the pot body 20 has a filling hole 23 on the rim 22 in communication with the water chamber H1. Water is filled into the water chamber H1 through the filling hole 23. Plug means may be used to close the filling hole 23. Further, an air pump motor M may be used, and operated to pump air into water in the water chamber H1.

Figure 6:
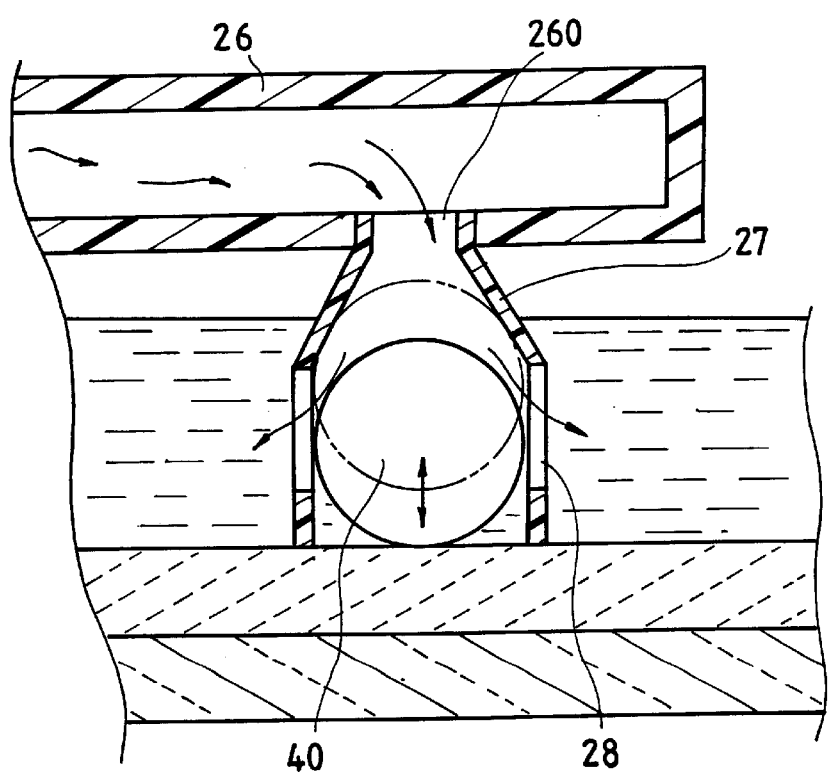
FIG. 6 is a sectional view in an enlarged scale of a part of an alternate form of the present invention.

FIG. 6 shows an alternate form of the present invention. According to this alternate form, a spherical float 40 is mounted in the hood 27, and floats with water to close/open the water hole 260 on the guide tube 26.

Figures 7, 7A:
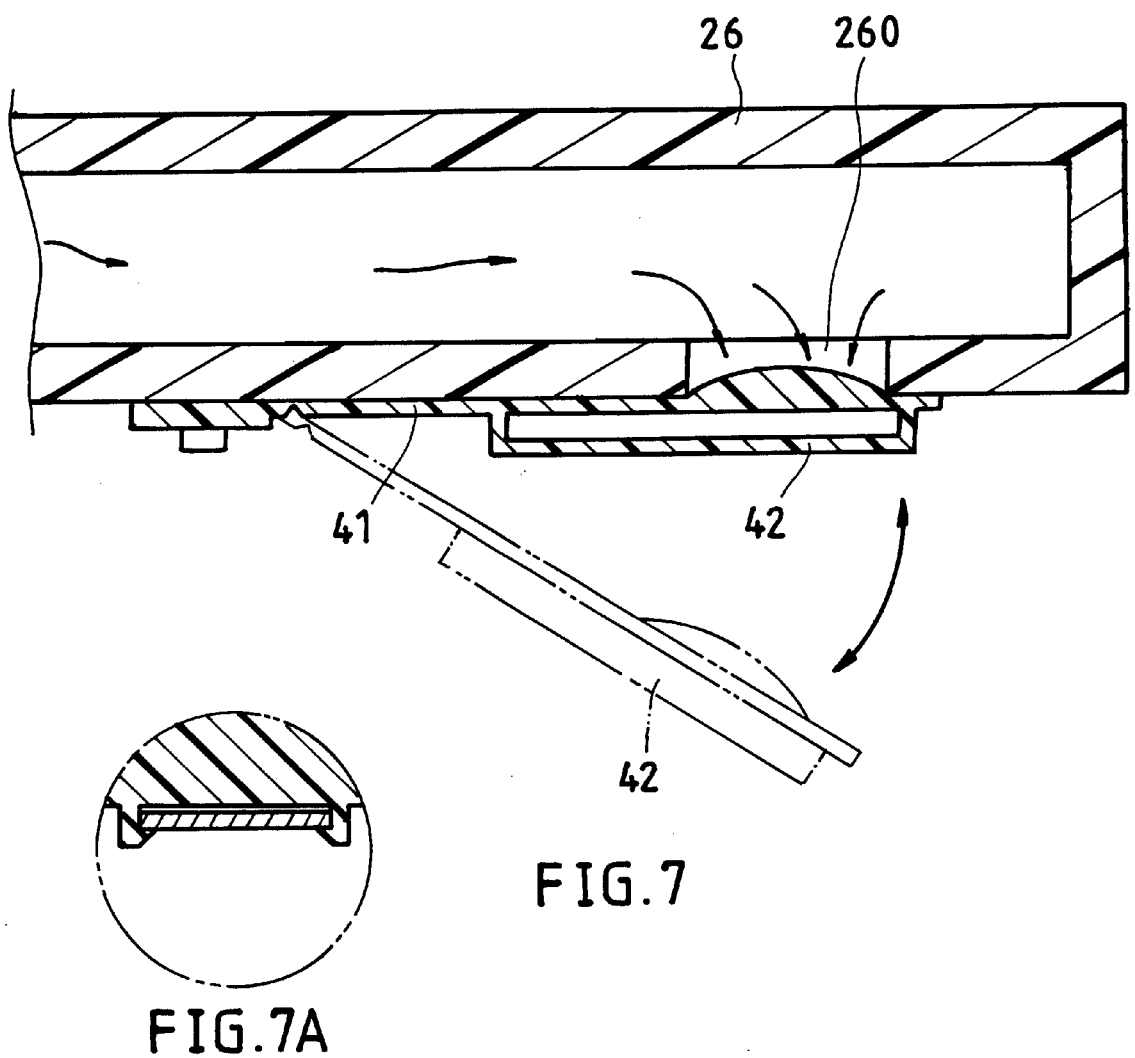
FIG. 7 is a sectional view in an enlarged scale of a part of another alternate form of the present invention.
FIG. 7A is an enlarged view of a part of FIG. 7.

FIG. 7 shows another alternate form of the present invention. According to this alternate form, an elongated valve flap 41 is provided having one end pivoted to the outside wall of the guide tube 26 at the bottom side near the water hole 260, and a float 42 is fixedly mounted on the free end of the valve flap 41. When the level of water drops below a predetermined range, the float 42 falls with water level for enabling water to flow out of the guide tube 26 through the water hole 260. On the contrary, when the level of water surpasses a predetermined range, the float 42 floats upwards with water to lift the free end of the valve flap 41, thereby causing the valve flap 41 to close the water hole 260 on the guide tube 26.

While only one embodiment of the present invention has been shown and described, it will be understood that various modifications and changes could be made thereunto without departing from the spirit and scope of the invention disclosed.

What the invention claimed is:

1. A flowerpot comprising:
 a hollow, cylindrical, transparent, top-open casing, said casing comprising an upright locating tube at the center of a bottom wall thereof for guiding in air from the atmosphere;
 a pot body mounted in said casing;
 a water chamber defined within said casing around said pot body for holding water for keeping fish, water animals and plants; and
 a soil carrier mounted in said pot body and spaced above a through hole on said pot body for holding soil in said pot body for growing plants, said soil carrier comprising a plurality of air vents disposed in communication with a space defined within said pot body below said soil carrier, and a plurality of recessed top-open chambers, said recessed top-open chambers each comprising a plurality of through holes respectively disposed in communication with the space defined within said pot body below said soil carrier;

wherein:
 said casing comprises a coupling flange raised around the order of a top-open side thereof;
 said pot body comprising a coupling flange raised around a top rim thereof and hooked on the coupling flange at said casing, an upright locating tube raised from a bottom wall thereof and coupled to the upright locating tube at said casing for guiding in air, a through hole through the periphery thereof, a guide tube fastened to the through hole on the periphery of said pot body, said guide tube having an outer end opened and disposed in communication with said water chamber, an inner end closed and suspended inside said pot body, and a water hole through the periphery thereof at a bottom side near said inner end for guiding water from said water chamber to the space defined within said pot body below said soil carrier, and valve means coupled to said guide tube and moved with water level in said pot body to close/open the water hole on said guide tube.

2. The flowerpot of claim 1 wherein said valve means comprises a hood provided at said guide tube around the water hole on said guide tube, said hood having a plurality of water holes disposed in communication between the water hole on said guide tube and the space within said pot body below said soil carrier, and a spherical float moved with water in said hood to close/open the water hole on guide tube.

3. The flowerpot of claim 1 wherein said valve means comprises an elongated valve flap having one end pivoted to an outside wall of said guide tube at a bottom side near the water hole on said guide tube and a free end, and a float fixedly mounted on the free end of said valve flap and floating with water to move the free end of said valve flap relative to the water hole on said guide tube for enabling the water hole on said guide tube to be closed/opened subject to the level of water in the space in said pot body.

4. The flowerpot of claim 1 wherein the upright locating tube of said pot body has a top-open end disposed above the elevation of said guide tube below the elevation of said soil carrier.

\* \* \* \* \*